(12) United States Patent
Feng et al.

(10) Patent No.: US 11,519,556 B2
(45) Date of Patent: Dec. 6, 2022

(54) GASEOUS HYDROGEN STORAGE SYSTEM WITH CRYOGENIC SUPPLY

(71) Applicant: UT-Battelle, LLC, Oak Ridge, TN (US)

(72) Inventors: Zhili Feng, Knoxville, TN (US); Yanli Wang, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 54 days.

(21) Appl. No.: 17/215,035

(22) Filed: Mar. 29, 2021

(65) Prior Publication Data

US 2021/0269301 A1    Sep. 2, 2021

Related U.S. Application Data

(62) Division of application No. 15/845,185, filed on Dec. 18, 2017, now abandoned.

(Continued)

(51) Int. Cl.
*F17C 7/04* (2006.01)
*B67D 7/04* (2010.01)
(Continued)

(52) U.S. Cl.
CPC .............. *F17C 7/04* (2013.01); *B01D 5/0048* (2013.01); *B67D 7/0482* (2013.01); *C01B 3/00* (2013.01);
(Continued)

(58) Field of Classification Search
CPC ........ F17C 2205/0142; F17C 2221/012; F17C 2223/0161; F17C 7/04; F17C 9/02
See application file for complete search history.

(56) References Cited

U.S. PATENT DOCUMENTS

| | | | | | |
|---|---|---|---|---|---|
| 5,243,821 | A | * | 9/1993 | Schuck | ..................... F17C 7/04 62/50.1 |
| 5,409,046 | A | * | 4/1995 | Swenson | .................. F17C 9/02 141/2 |

(Continued)

OTHER PUBLICATIONS

International Search Report and Written Opinion for WO Application No. PCT/US2017/066926, dated Feb. 14, 2018.

*Primary Examiner* — Andrew D StClair
(74) *Attorney, Agent, or Firm* — Warner Norcross + Judd LLP (57) ABSTRACT

A gaseous hydrogen storage and distribution system with a cryogenic supply and a method for the cryogenic conversion of liquid hydrogen into high-pressure gaseous hydrogen are provided. The gaseous hydrogen storage and distribution system includes pressuring liquid hydrogen from a cryogenic tank using a low pressure liquid pump before vaporization within a relatively small vaporizer. The resulting high pressure gaseous hydrogen is transferred to a plurality of storage tanks at ambient temperature according to a desired fill sequence. The high pressure hydrogen gas is subsequently distributed from the storage tanks through a hydrogen fueling dispenser according to a desired dispensing sequence. The present system and method provide improvements in operational safety, eliminates the use of high pressure gas compressor, and minimizes boiling off and ventilation losses at a reduced cost when compared to existing thermal compression storage systems.

14 Claims, 7 Drawing Sheets

Related U.S. Application Data (60) Provisional application No. 62/565,587, filed on Sep. 29, 2017, provisional application No. 62/515,044, filed on Jun. 5, 2017.

(51) Int. Cl.
    *B01D 5/00*     (2006.01)
    *F17C 5/06*     (2006.01)
    *C01B 3/00*     (2006.01)
    *F17C 9/02*     (2006.01)
    *F17C 7/00*     (2006.01)
    *F17C 5/00*     (2006.01)
    *C01B 3/50*     (2006.01)

(52) U.S. Cl.
CPC ............... *F17C 5/002* (2013.01); *F17C 5/06* (2013.01); *F17C 7/00* (2013.01); *F17C 9/02* (2013.01); *C01B 3/506* (2013.01); *F17C 2205/0142* (2013.01); *F17C 2221/012* (2013.01); *F17C 2223/0123* (2013.01); *F17C 2223/0161* (2013.01); *F17C 2223/033* (2013.01); *F17C 2223/036* (2013.01); *F17C 2225/0123* (2013.01); *F17C 2225/036* (2013.01); *F17C 2227/0135* (2013.01); *F17C 2227/0309* (2013.01); *F17C 2227/0311* (2013.01); *F17C 2227/0393* (2013.01); *F17C 2250/01* (2013.01); *F17C 2250/043* (2013.01); *F17C 2250/0439* (2013.01); *F17C 2265/063* (2013.01); *F17C 2265/065* (2013.01); *F17C 2270/0139* (2013.01)

(56) References Cited

U.S. PATENT DOCUMENTS

| | | | |
|---|---|---|---|
| 5,505,232 A | | 4/1996 | Barclay |
| 5,590,535 A | * | 1/1997 | Rhoades .................. F17C 9/02 62/7 |
| 5,687,776 A | * | 11/1997 | Forgash .................... F17C 9/00 141/2 |
| 5,755,265 A | | 5/1998 | Stouten |
| 5,762,119 A | | 6/1998 | Platz et al. |
| 5,934,081 A | * | 8/1999 | Notaro ...................... F17C 5/06 62/50.2 |
| 6,044,647 A | | 4/2000 | Drube et al. |
| 7,128,103 B2 | * | 10/2006 | Mitlitsky ........... H01M 8/04089 141/82 |
| 7,926,403 B1 | | 4/2011 | Vigil et al. |
| 2002/0041823 A1 | * | 4/2002 | Blaszczyk ................ F17C 5/02 422/1 |
| 2006/0156744 A1 | | 7/2006 | Cusiter et al. |
| 2008/0226463 A1 | | 9/2008 | Batenburg et al. |
| 2010/0212772 A1 | | 8/2010 | Allidieres |
| 2010/0307636 A1 | | 12/2010 | Uemura |
| 2014/0290790 A1 | | 10/2014 | Mathison |
| 2016/0146401 A1 | | 5/2016 | Leachman et al. |

\* cited by examiner

GASEOUS HYDROGEN STORAGE SYSTEM WITH CRYOGENIC SUPPLY

CROSS-REFERENCE TO RELATED APPLICATIONS

This application is a divisional of U.S. patent application Ser. No. 15/845,185, filed Dec. 18, 2017, which claims the benefit of U.S. Provisional Application 62/515,044, filed Jun. 5, 2017, and U.S. Provisional Patent Application 62/565,587, filed Sep. 29, 2017, the disclosures of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to the storage and distribution of diatomic hydrogen as a fuel source for vehicles and other applications.

BACKGROUND OF THE INVENTION

The use of diatomic hydrogen as a fuel source for vehicles has been explored on a large scale for a variety of reasons. Diatomic hydrogen can be produced from renewable sources, for example through the electrolysis of water. In addition, the use of hydrogen as an energy source typically produces much less pollution than alternative fuels. In particular, the byproduct of a hydrogen is water vapor, rather than carbon monoxide, sulfur dioxide and other greenhouse gases associated with the combustion of fossil fuels.

The desire to integrate hydrogen into the transportation infrastructure has prompted interest in affordable storage and distribution technologies. Currently, high-pressure gaseous hydrogen is the primary source of hydrogen for fuel cell vehicles. The delivery of liquid hydrogen, however, is currently the most economic means of hydrogen delivery. Consequently, there remains a need for the conversion of liquid hydrogen to high-pressure gaseous hydrogen.

Existing methods for converting liquid hydrogen to gaseous hydrogen include the vaporization of low pressure liquid hydrogen, typically below 5 bar, into high pressure gaseous hydrogen. The gaseous hydrogen is then stored within accumulators. The accumulators are required to maintain a sufficient pressure, in order to dispense hydrogen to fill a vehicle fuel tank to its target pressure, for example at 700 bar. Consequently, a gas compressor is required to pressurize the gaseous hydrogen in the accumulators to greater than 700 bar. In addition, a gas compressor is required to evacuate gaseous hydrogen from the vaporizer in order to fill the vaporizer with additional liquid hydrogen from low pressure cryogenic storage. Furthermore, existing methods often suffer from boiling off and venting losses of hydrogen, as much as 34%, and relatively high operational costs associated with high pressure compressors.

Accordingly, there remains a continued need for an improved system and method for the thermal compression of gaseous hydrogen that minimizes venting losses and that lessens the overall operational costs associated with existing hydrogen storage and distribution systems.

SUMMARY OF THE INVENTION

A gaseous hydrogen storage and distribution system with a cryogenic hydrogen supply and a method for the cryogenic conversion of liquid hydrogen into high-pressure gaseous hydrogen are provided. The system and method disclosed herein utilizes a low-pressure liquid pump whose pressure rating is typically only 10-15% of the full pressure of a target tank (such as the hydrogen fuel tank in a car) as achieved with a specific fill sequence for a gaseous hydrogen storage system. The operating pressure of the low-pressure liquid pump can be furthermore reduced by pre-cooling with a hydrogen reservoir containing low temperature hydrogen or liquid hydrogen before entering the vaporizer, and by reducing the effective thermal mass of the vaporizer. In accordance with the present invention, except for a low pressure liquid pump, no other gaseous compressors are necessary for the operation of the system including converting low pressure liquid hydrogen to high pressure gaseous hydrogen, transporting high pressure gaseous hydrogen from one part to the other part of the gaseous hydrogen storage system, and finally dispensing the stored gaseous hydrogen to a fuel tank.

In one embodiment, the system includes a cryogenic storage tank containing liquid hydrogen between 1 bar and 5 bar, optionally an on-site liquid tube trailer. A low-pressure liquid pump transfers liquid hydrogen to one or more vaporizers. The liquid pump increases the pressure of liquid hydrogen within the vaporizers to a predetermined level that is essentially the same as or slightly higher than the pressure of a gas storage tank having the lowest pressure rating or capacity in the gaseous hydrogen storage system. An example of the predetermined pressure level of liquid hydrogen to fill a 700 bar tank in a hydrogen vehicle may be between 100 bar and 150 bar. The vaporizers convert this pressurized liquid hydrogen to gaseous hydrogen at up to 1200 bar with heat supplied from atmospheric air or an auxiliary heating source. The vaporizers then output gaseous hydrogen to the gaseous hydrogen storage system that is operated at ambient temperature or a specific temperature range that is typically at ambient temperature or slightly lower than ambient temperature, according to a specific sequence to fill individual gas storage tanks. The pressure rating of each gas storage tank is individually selected to maximize the utilization of converted gas and to minimize the cost and pressure capacity requirements of the liquid hydrogen pump. The highest pressure gas storage tank in the gaseous hydrogen storage system contains gaseous hydrogen up to 1200 bar which is substantially higher than the full pressure of a vehicle fuel tank, whereas the lowest pressure storage tank contains gaseous hydrogen at a pressure level only marginally higher than the residual pressure of a hydrogen vehicle before being filled by the system. For example, the overhead pressure may be 50-200 bar above the residual pressure. Furthermore, the lowest pressure storage tank allows withdrawing of gaseous hydrogen from the vaporizers. This makes it possible that a low-pressure liquid hydrogen pump (with pressure rating slightly above the pressure in the lowest pressure storage tank) be used to pump liquid hydrogen to the vaporizers for refilling operations. Lastly, the gaseous hydrogen storage system dispenses hydrogen to a hydrogen vehicle without the use of gaseous compressors, but still achieving high pressure filling of the hydrogen vehicle.

In another embodiment, the method includes pressuring liquid hydrogen from a cryogenic supply using a liquid pump into a relatively small but well insulated low temperature hydrogen reservoir connected to the vaporizer. The reservoir pre-cools the gaseous hydrogen in the vaporizer to substantially below ambient temperature to substantially reduce the pressure in the vaporizer before it is filled with liquid hydrogen. The use of pre-cooling further reduces the pressure capacity requirements of the liquid pump. The resulting gaseous hydrogen is stored within a gaseous hydrogen storage system at a design temperature. The high pressure hydrogen gas is distributed from the gaseous hydrogen storage system through a hydrogen fueling dispenser.

The system and method can provide improvements in operational safety and can eliminate or minimize boiling off and ventilation losses at a reduced cost when compared to existing storage systems. The system and method are optionally "compressor-less," which as used herein means without the use of a compressor for compressing gaseous hydrogen. Though described herein in relation to hydrogen fueling systems for passenger vehicles, the system and method of the present invention are equally well suited for other applications, including hydrogen fueling systems for trucks, buses, and trains, for example.

These and other features and advantages of the present invention will become apparent from the following description of the invention, when viewed in accordance with the accompanying drawings and the appended claims. Before current embodiments are explained in further detail, it is to be understood that the invention is not limited to the details of operation set forth in the following description or illustrated in the drawings. The invention may be implemented in various other embodiments and of being practiced or being carried out in alternative ways not expressly disclosed herein.

DETAILED DESCRIPTION OF THE CURRENT EMBODIMENTS

Figure 1:
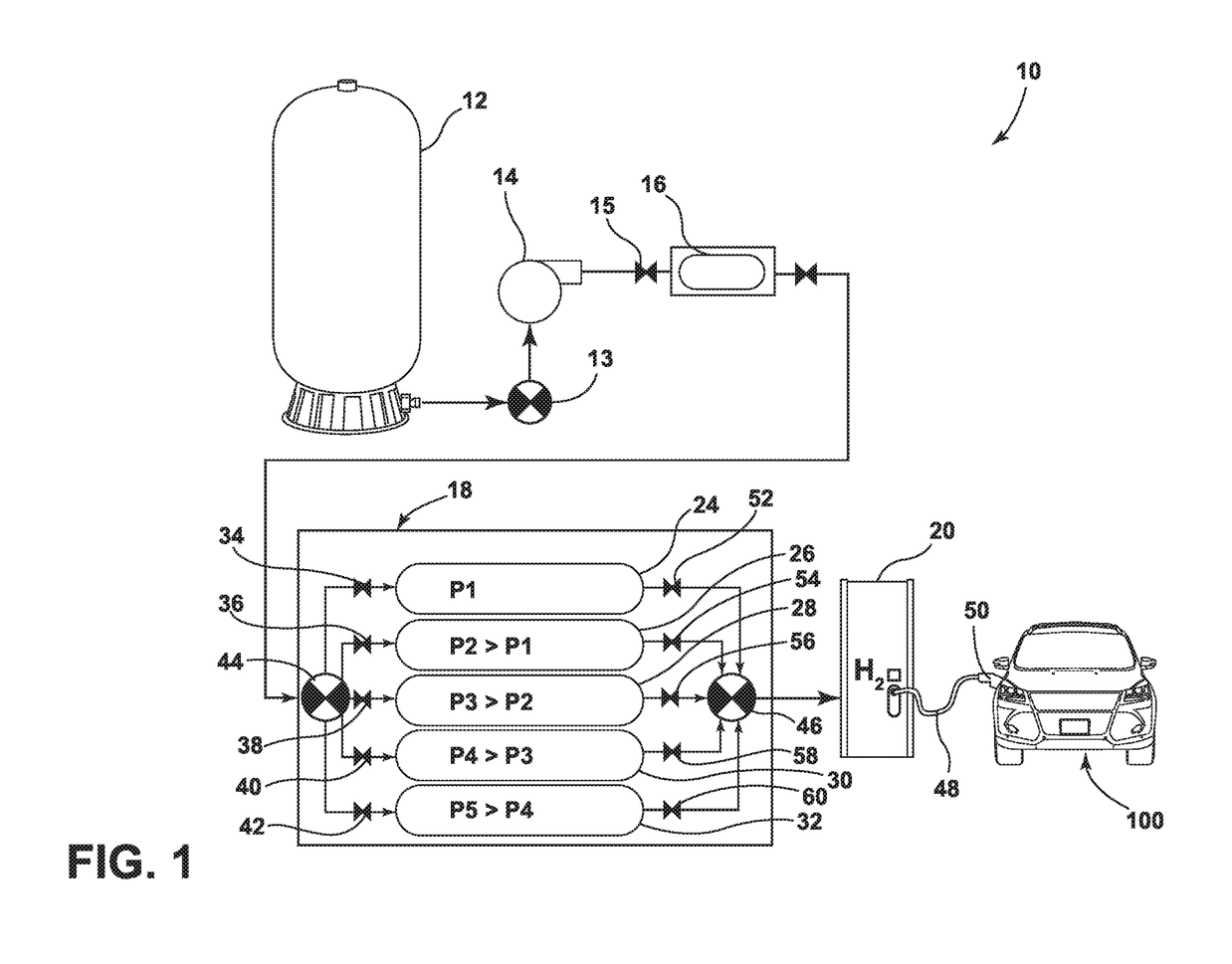
FIG. 1 is a schematic diagram of a hydrogen storage and distribution system for the cryogenic conversion of liquid hydrogen into high-pressure hydrogen gas.

Referring now to FIG. 1, a gaseous hydrogen storage and distribution system in accordance with a current embodiment is illustrated and generally designated 10. The gaseous hydrogen storage and distribution system 10 is compressor-less in the illustrated embodiment and generally includes a cryogenic storage tank 12, a liquid pump 14 in communication with the cryogenic storage tank 12, at least one vaporizer 16 in fluid communication with the liquid pump 14 so that cryogenic liquid hydrogen may be pumped from the cryogenic storage tank 12 to the at least one vaporizer 16, a high pressure gaseous hydrogen storage system 18 coupled to an output of the at least one vaporizer 16 for receiving a supply of high pressure gaseous hydrogen, and a hydrogen fuel dispenser 20 in communication with the gaseous hydrogen storage system 18 and adapted to dispense gaseous hydrogen to a vehicle fuel tank 100 without a compressor for gaseous hydrogen.

More specifically, the cryogenic storage tank 12 is suitable for bulk storage of liquid hydrogen, and generally includes a double-walled construction having an outer jacket surrounding an inner tank with an evacuated space therebetween for insulation. The double-walled cryogenic storage tank 12 in the current embodiment contains liquid hydrogen at 20K between 1 bar and 5 bar, inclusive. The cryogenic storage tank 12 is further optionally an on-site liquid tube trailer. In this respect, bulk amounts of liquid hydrogen can be transported in cryogenic storage vessels 12 commercially by truck or rail and used on-site in connection with the hydrogen storage and distribution system 10.

The liquid pump 14 is in communication with the cryogenic storage tank 12 through a valve 13. The liquid pump 14 is optionally a low-pressure liquid pump. As used herein, a "low pressure" liquid pump is operable to pressurize liquid hydrogen to no more than 20% of the highest pressure rating of the hydrogen storage system, e.g., 200 bar for a 1000 bar high pressure gaseous hydrogen storage system. As shown in FIG. 1, the liquid pump 14 is connected between the cryogenic storage tank 12 and the at least one vaporizer 16. The pump 14 is a centrifugal pump in the current embodiment, while in other embodiments the pump 14 is a positive displacement pump. The liquid pump 14 is adapted to pressurize liquid hydrogen to a predetermined pressure level that is essentially the same as or slightly above the pressure P1 of storage tank 24 which has the lowest pressure rating in the gaseous hydrogen storage system, thereby increasing the enthalpy of the supplied liquid hydrogen prior to a phase change into gaseous hydrogen. For example, in refueling of hydrogen vehicles, the liquid pump may have a pressure rating of 150 bar, further optionally between 100 bar and 250 bar. An optional pressure sensor in the feedline to the at least one vaporizer 16 measures the downstream pressure of liquid hydrogen, by which the liquid pump 14 can operate in accordance with a closed feedback loop to ensure the pressure of liquid hydrogen within the at least one vaporizer 16 is at least a minimum threshold pressure. In addition, the liquid pump 14 ensures that the buildup of pressure within the at least one vaporizer 16 does not force liquid hydrogen back into the cryogenic storage tank 12.

The at least one vaporizer 16 is in communication with the liquid pump 14 through a valve 15, being connected between the liquid pump 14 and the gaseous hydrogen storage system 18. The at least one vaporizer 16 is adapted to convert liquid hydrogen to gaseous hydrogen by increasing the temperature of the pressurized liquid hydrogen to its saturation temperature. In the current embodiment, the liquid hydrogen is warmed by a heat exchanger through the introduction of ambient air. In other embodiments, the liquid hydrogen is heated to its saturation temperature (for a corresponding saturation pressure) through the introduction of warmed air or other fluid that will not freeze in operation, as an auxiliary heating source. The hydrogen in the vaporizer 16 is auto-pressurized or cryo-compressed to between 300 bar and 1200 bar, inclusive, resulting from temperature increase without the use of a compressor for gaseous hydrogen. As optionally shown in FIG. 2, the at least one vaporizer 16 includes a plurality of vaporizers 16 connected in parallel with each other between the pump 14 and the gaseous hydrogen storage system 18. The use of multiple vaporizers increases productivity of the overall system 10. The vaporizers 16 are optionally small (between 1 kg to 5 kg) while being adapted to sustain temperature and cyclic loading.

Figure 3:
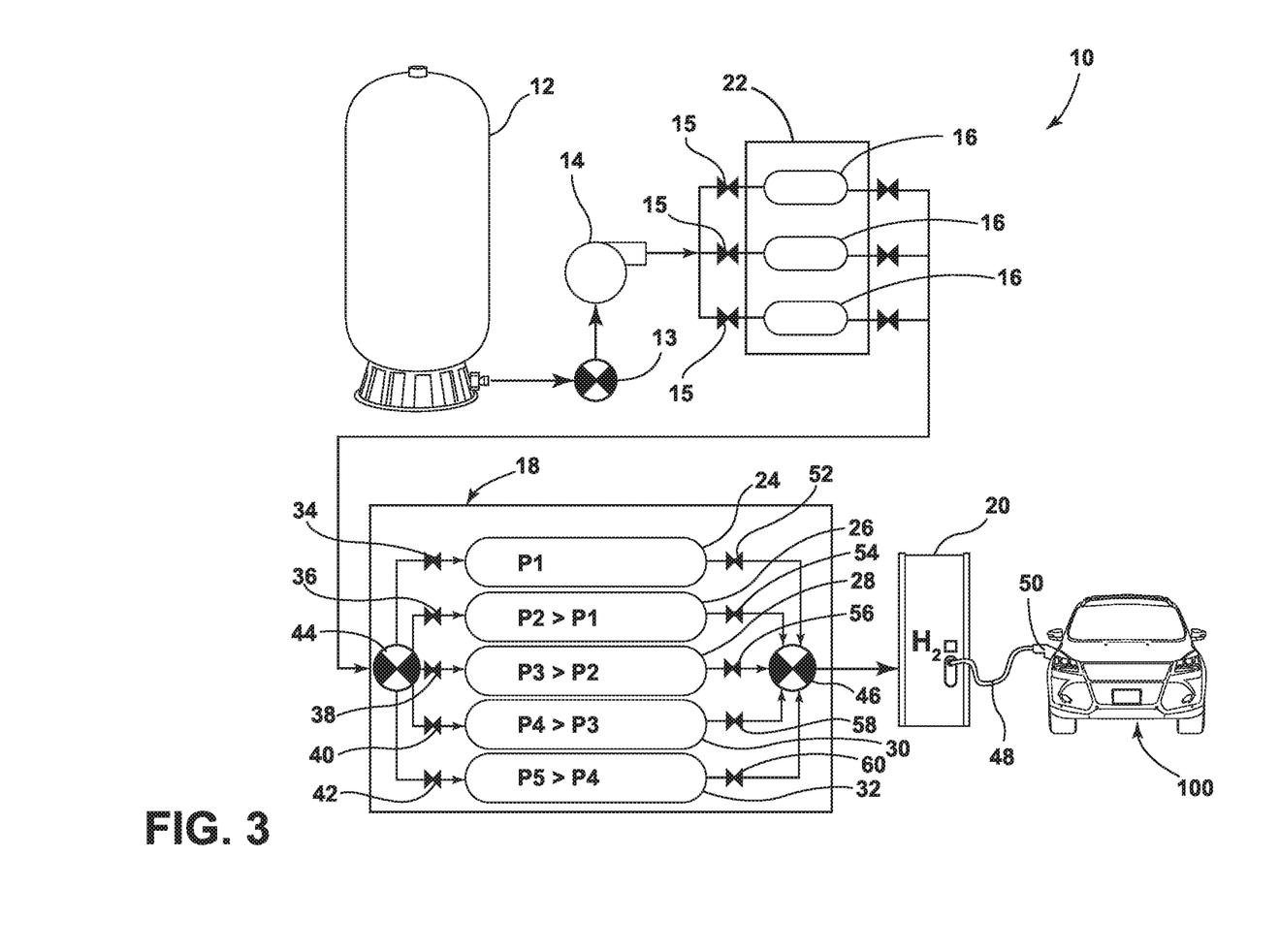
FIG. 3 is a schematic diagram of the hydrogen storage and distribution system of FIG. 2 including a vaporizer pre-cooling system.

As optionally shown in FIG. 3, the one or more vaporizers 16 include a pre-cooling system 22 using liquid hydrogen from the cryogenic storage tank 12. An optional temperature sensor measures the temperature of the at least one vaporizer 16, by which liquid hydrogen can be circulated through the pre-cooling system 22 in accordance with a closed feedback loop to ensure the temperature of the at least one vaporizer 16 is less than a maximum temperature. By pre-cooling the at least one vaporizer 16 as discussed below in connection with FIG. 4, the pressure in the at least one vaporizer 16 is further reduced, allowing for an even lower pressure liquid pump for cost and efficiency. That is, the vapor pressure in the vaporizer is reduced, which results in a corresponding reduction in the pressure requirement of the liquid pump 14, thereby reducing the cost and improving the reliability of the system.

The gaseous hydrogen storage system 18 is in fluid communication with the at least one vaporizer 16, being connected between the at least one vaporizer 16 and the hydrogen fuel dispenser 20. The gaseous hydrogen storage system 18 includes a plurality of gas storage tanks 24, 26, 28, 30, 32 and an intake manifold. The gas storage tanks 24, 26, 28, 30, 32 have different pressure ratings, P1, P2, P3, P4, P5. More specifically, as illustrated FIGS. 1 through 3, the pressure ratings of gas storage tanks are arranged in a cascading fashion: P1<P2<P3<P4<P5. The gas storage tank 24 has the lowest pressure rating P1, which is marginally higher than the residual pressure in a target refueling tank such as the fuel tank 100 in a hydrogen vehicle. In certain applications such as filling a fuel tank in a hydrogen vehicle that has a residual pressure of 100 bar before filling and will be filled to 700 bar, the pressure rating of tank 32, P5, may be 900 bar, and the pressure rating of tank 24, P1, may be 150 bar. The pressure ratings, P4, P3, and P2, of the remaining tanks 30, 28, and 26 may be 700 bar, 500 bar and 300 bar respectively.

The intake manifold includes a master intake valve 44 and plurality of control valves 34, 36, 38, 40, 42 corresponding to the plurality of gas storage tanks 24, 26, 28, 30, 32, such that each of the plurality of gas storage tanks 24, 26, 28, 30, 32 can be independently filled with gaseous hydrogen from the at least one vaporizer 16. Control valves 34, 36, 38, 40, 42 are generally one-way, i.e., only allow gaseous hydrogen flowing from vaporizer to the respective gas storage tanks. Furthermore, the high pressure gaseous hydrogen storage system 18 includes a discharge manifold including a master discharge valve 46 and a plurality of one-way discharge valves 52, 54, 56, 58, 60 corresponding to the plurality of gas storage tanks 24, 26, 28, 30, 32. These one-way discharge values only allow gaseous hydrogen to be dispensed from one of the gas storage tanks to the dispenser 20.

Figure 2:
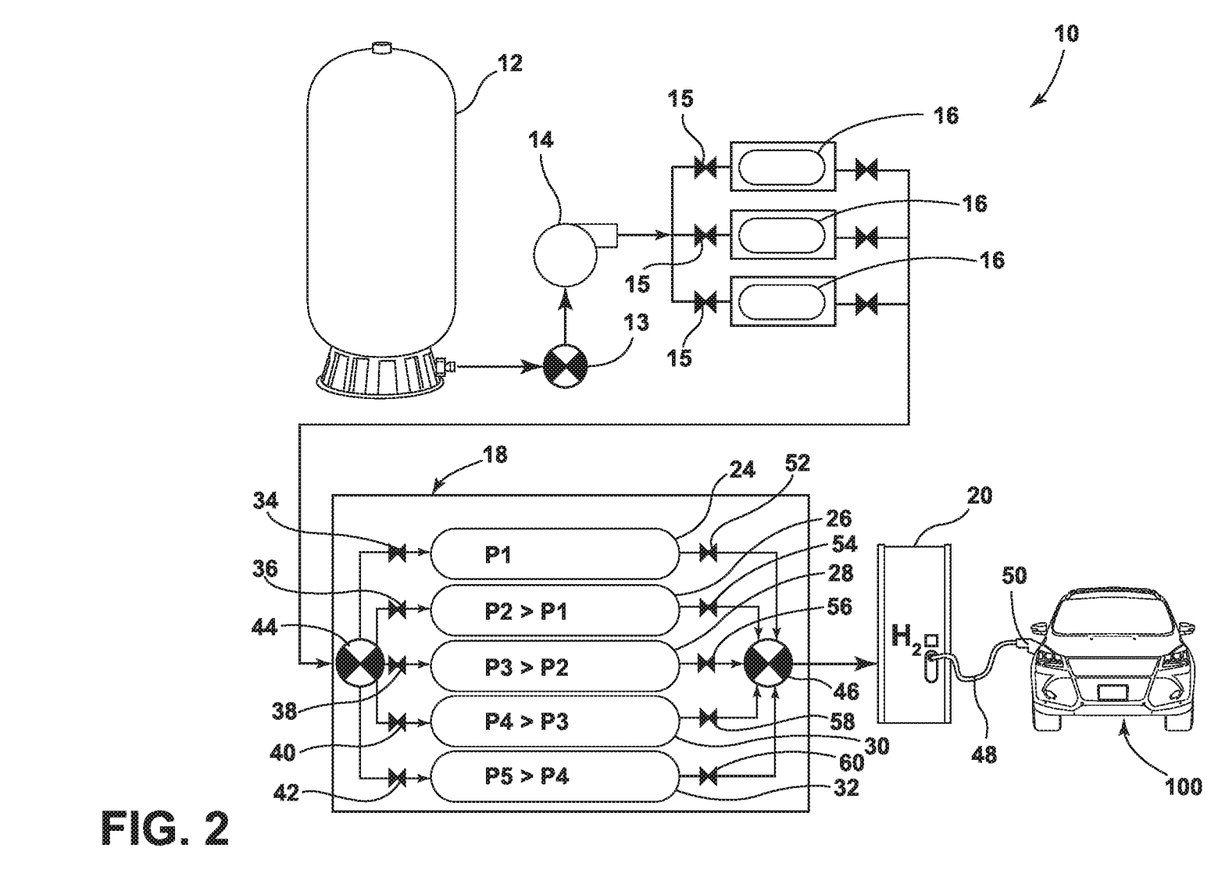
FIG. 2 is a schematic diagram of the hydrogen storage and distribution system of FIG. 1 including multiple vaporizers.

The high pressure gaseous hydrogen storage system 18 includes an outer storage vessel containing the plurality of gas storage tanks. The storage vessel is adapted to withstand high internal pressures of up to 900 bar, further optionally 1200 bar, while the internal gas is stored at ambient temperatures (i.e., between 0° C. to 20° C.). While five gas storage tanks are shown in FIGS. 1 through 3, greater or fewer number of storage tanks can exist in other high pressure storage vessels, including for example at least five storage tanks. In addition, the pressure rating/capacity of the gas storage tank progressively increases for the optimal dispensing of gaseous hydrogen. The storage vessel is optionally a high pressure steel concrete composite vessel, being sufficiently large to have the thermal mass necessary to manage cycling temperature changes due to charging and discharging while also meeting peak dispensing needs. A suitable high pressure storage vessel is disclosed for example in U.S. Pat. No. 9,562,646 to Wang et al and entitled "Hydrogen Storage Container," the contents of which are incorporated by reference in their entirety.

The hydrogen fuel dispenser 20 includes a dispensing line 48 and a nozzle 50 for dispensing gaseous hydrogen to a receptacle leading to a vehicle fuel tank 100, for example a vehicle fuel tank for a car, a truck, or a bus. The hydrogen fuel dispenser 20 is in communication with the gaseous hydrogen storage system 18, the gaseous hydrogen storage system 18 being operable as a cascade system. As used herein, a "cascade system" means a system of gas storage tanks that serially dispense gas from the gas storage tank with the lowest usable pressure first followed by the gas storage tank with the next lowest useable pressure and so on. In operation, gaseous hydrogen is firstly withdrawn from the gas storage tank having the lowest internal pressure, but above that of the vehicle fuel tank 100, for example at least 10 to 100 bar greater than that of the vehicle fuel tank 100. When a vehicle fuel tank 100 is fueled, for example, a first discharge valve between a first gas storage tank 24, which has the lowest operating pressure rating, and the hydrogen fuel dispenser 20 is opened. When this valve is opened, gaseous hydrogen flows from the first gas storage tank 24 to the vehicle fuel tank 100 under a positive pressure differential until the pressure in the first gas storage tank 24 and the vehicle fuel tank 100 equalize. Once the pressure is equalized, the first discharge valve (optionally a ball valve) will close, and the discharge valve between the second gas storage tank 26 and the hydrogen fuel dispenser 20 is opened. When this valve is opened, gaseous hydrogen flows from the second gas storage tank 26 and the vehicle fuel tank 100 under a positive pressure differential until the pressure in the second storage tank 26 and the vehicle fuel tank 100 equalize, at which point the second discharge valve will close. This process continues until the vehicle fuel tank 100 is filled to the required refilling pressure which is equal or less than the highest pressure (P5) vessel (32) in the gaseous hydrogen storage system. Those gas storage tanks having a low internal pressure are subsequently filled with gaseous hydrogen directly from the at least one vaporizer 16.

A corresponding method for converting and storing hydrogen gas will now be described, the method being performed without a compressor for gaseous hydrogen. High pressure gaseous hydrogen is generated by means of autogenesis pressurization or cryo-compression as liquid hydrogen is converted to gaseous hydrogen by raising the temperature of vaporizer during the conversion process. The method improves conversion efficiency with minimal boiling off and ventilation losses, thereby significantly reducing operational costs, when compared to existing storage systems. The method generally includes providing a supply of liquid hydrogen between 1 bar and 5 bar, inclusive. This step is generally performed with the cryogenic storage tank 12 of FIGS. 1-3 for example. The method then includes supplying the vaporizer 16 with a predetermined amount of the liquid hydrogen that, when fully auto-pressurized by increasing temperature, will reach the required pressure level up to 1200 bar in the vaporizer, which is high enough to fill the gaseous hydrogen storage system 18 without a gaseous compressor. In order to add the required amount of liquid hydrogen to the vaporizer, a liquid pump 14 is generally used to pump liquid hydrogen into and pressurize the liquid hydrogen in a vaporizer 16. Depending on the system design and the effective thermal mass of the vaporizer, the liquid pump may need to have a pressure rating that is the same as or slightly higher than P1, the pressure capacity of a gas storage tank 24 having the lowest pressure rating in the gaseous hydrogen storage system 18. For certain applications, the pressure rating of the liquid pump is 10-50 bar, inclusive, above P1. The liquid pump can be for example a centrifugal pump. The vaporizer 16 is optionally pre-cooled with a reservoir of cryogenic liquid hydrogen from the cryogenic storage tank 12 or low temperature hydrogen, during the process the liquid hydrogen is pumped into the vaporizer. In addition, the vaporizer 16 is optionally one of a plurality of vaporizers to increase system productivity. After being filled with liquid hydrogen to a pre-determined level, connection between the low pressure liquid pump 14 and vaporizer 16 is closed via control valve 15. Using an internal heat exchanger and/or heat leak from surrounding ambient temperature, heat is supplied to the vaporizer 16 and the hydrogen inside, resulting in conversion of liquid hydrogen to gaseous hydrogen and subsequent autogenous pressurization or cryo-compression of the gaseous hydrogen as the temperature in the vaporizer rises to the ambient temperature. At the end of autogenous pressurization, the high-pressure hydrogen gas in the vaporizer is generally at ambient temperature with pressure between 300 bar and 1200 bar, further optionally between 150 bar and 900 bar in the gaseous hydrogen storage system 18.

The high pressure gaseous hydrogen in the vaporizer then flows by means of positive pressure differential to a plurality of gas storage tanks within a storage system 18 for storage. The plurality of gas storage tanks are connected such that each gas storage tank can be independently filled with gaseous hydrogen from the vaporizer 16 to its rated pressure level. The pressure rating/capacity of different gas storage tanks in the system are designed to be different. For example, the gas storage tank with the lowest pressure rating only needs to be as high as 20% of the pressure rating of the storage system, whereas the gas storage tank with the highest pressure rating will be at the 100% of the pressure rating of the storage system. More specifically, the flow and transfer of gaseous hydrogen in the vaporizer to a plurality of gas storage tanks will follow a specific cascading sequence without the use of gaseous compressor, as described in the Examples below. The depleted vaporizer 16 will be filled with liquid hydrogen to start the next conversion and storage cycle.

A method for dispensing hydrogen from a plurality of gas storage tanks within a storage system 18 will now be provided, the method being performed without a compressor for gaseous hydrogen. In operation, gaseous hydrogen is firstly withdrawn from the gas storage tank having the lowest internal pressure, but above that of the vehicle fuel tank 100, for example at least 10 to 100 bar greater than that of the vehicle fuel tank 100. When a vehicle fuel tank 100 is fueled, for example, a first discharge valve between a first gas storage tank 24, which has the lowest operating pressure rating, and the hydrogen fuel dispenser 20 is opened. When this valve is opened, gaseous hydrogen flows from the first gas storage tank 24 to the vehicle fuel tank 100 under a positive pressure differential until the pressure in the first gas storage tank 24 and the vehicle fuel tank 100 equalize. Once the pressure is equalized, the first discharge valve 52 (optionally a ball valve) will close, and the discharge valve 54 between the second gas storage tank 26 and the hydrogen fuel dispenser 20 is opened. When this valve is opened, gaseous hydrogen flows from the second gas storage tank 26 and the vehicle fuel tank 100 under a positive pressure differential until the pressure in the second storage tank 26 and the vehicle fuel tank 100 equalize, at which point the second discharge valve will close. This process continues until the vehicle fuel tank 100 is filled to the required refilling pressure which is equal or less than the highest pressure (P5) vessel (32) in the gaseous hydrogen storage system. It is understood that switching to the next higher pressure storage tank during the above cascading dispensing operation may take place before the positive pressure differential diminishes to zero (or equalize) to speed up the dispensing process.

Figure 5:
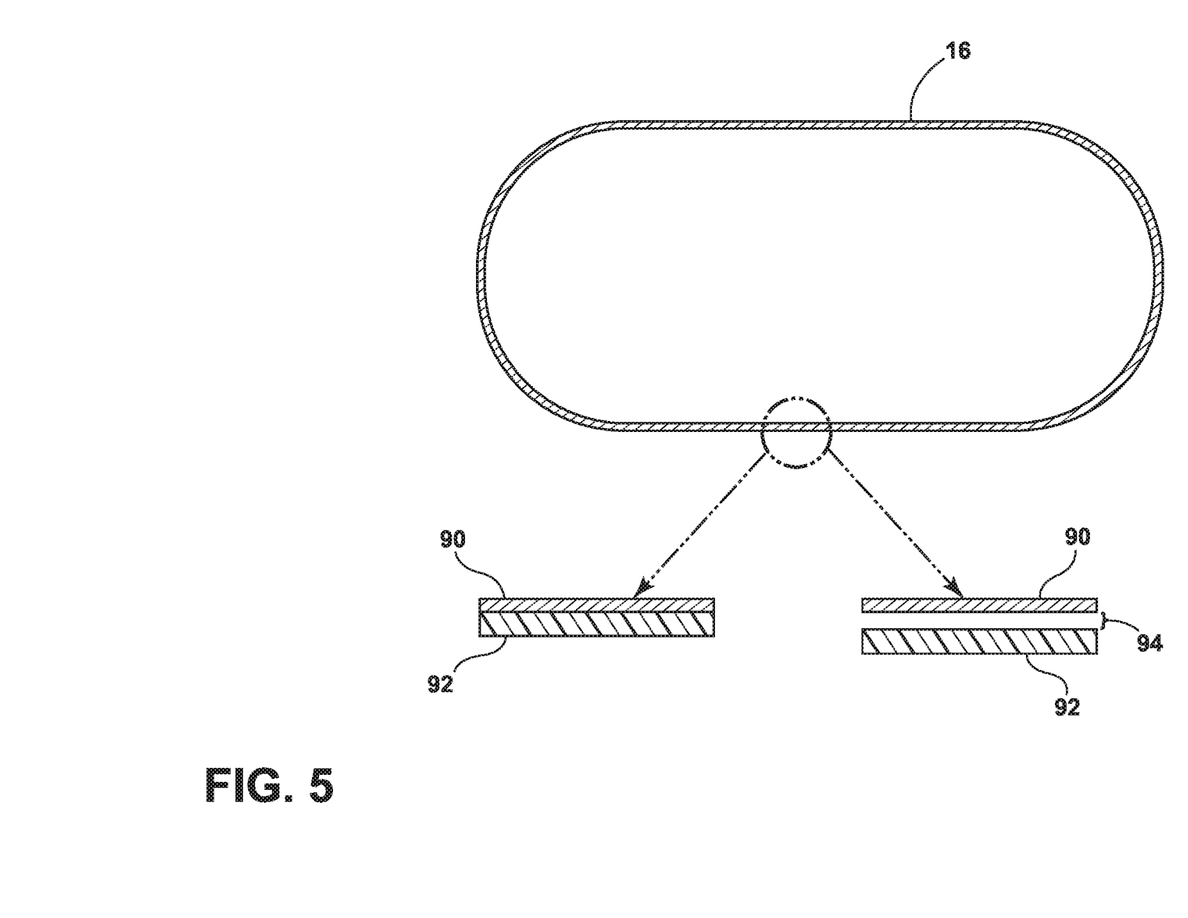
FIG. 5 is a cross-section of the pre-cooling mechanism of FIG. 4 illustrating a vacuum between resulting from different coefficients of thermal expansion.

The vaporizer 16 is optionally multi-layered. As shown in FIG. 5, the vaporizer 16 is double jacketed, having an inner layer 90 and an outer layer 92. The inner layer 90 is made of a material with a higher thermal expansion coefficient than the outer layer 92. At relatively high temperature and pressure, the inner layer 90 will bear against the outer layer 92. When the temperature within the vaporizer 16 is lowered, the differences in thermal contraction of the inner layer 90 and the outer layer 92 will result in a vacuum gap 94 between the layers. The vacuum gap 94 can provide insulation against heat transfer, and consequently only the inner layer 90 will contribute to the thermal mass effect of the vaporizer which slows down the decrease of the temperature when the vaporizer is being filled with liquid hydrogen. Therefore, the effective thermal mass of the vaporizer 16 will be substantially reduced compared to monolayer vaporizer. This in turn reduces the temperature and pressure increases during liquid pumping, therefore, a low-cost lower pressure liquid pump can be used. It is understood that both the inner layer 90 and outer layer 92 can have multiple layers to further reduce the effective thermal mass.

Example 1

The following example of a hydrogen conversion operation is provided for illustrative purposes, and is intended to be non-limiting. The illustration is aided by refilling a hydrogen fuel tank 100 to its capacity of 700 bar. Before the refilling, the hydrogen fuel tank 100 has some residual hydrogen at 100 psi, which is approximately 15% of the full capacity of tank 100. The hydrogen fuel tank 100 is designed to contain 4 kg hydrogen at full capacity.

In order to provide efficient refueling of the hydrogen tank 100, the gaseous hydrogen storage system 18 shown in FIGS. 1 through 3 is designed such that the fifth gas storage tank 32 has the highest pressure rating P5 among all the gas storage tanks. More specifically, the fifth gas storage tank 32 in this example has a pressure rating of 900 bar (P5=900 bar) at full capacity. The fourth gas storage tank 30 has the next highest pressure rating of P4 (700 bar). The third gas storage tank 28 is rated at P3 (500 bar). The second gas storage tank 26 is rated at P2 (300 bar), and the first gas storage tank 24 is rated at P1 (150 bar), which is 50 bar above the pressure of the residual hydrogen in the hydrogen fuel tank 100 before refilling.

The vaporizer 16 in this example has a capacity of 1-5 kg of hydrogen. The gas storage tanks 24, 26, 28, 30, 32 are much larger in storage capacity than the vaporizer, for example, 20 to 100 times larger. Further, these gas storage tanks may be different in size. For example, low pressure tank 24 may be substantially larger in physical volume or hydrogen storage capacity than the high pressure tank 32.

Finally, the liquid hydrogen pump 14 has a pressure rating of 160 bar, which is 10 bar higher than P1 (150 bar) in accordance with the present invention. It is understood that converting and filling storage tanks are only needed when the hydrogen in the storage tanks are below their pressures for full capacity. For example, the actual pressure in tank 32 may be between 900 bar to 700 bar, i.e., between its full pressure rating and the pressure rating of the next highest pressure tank 30.

Figure 6:
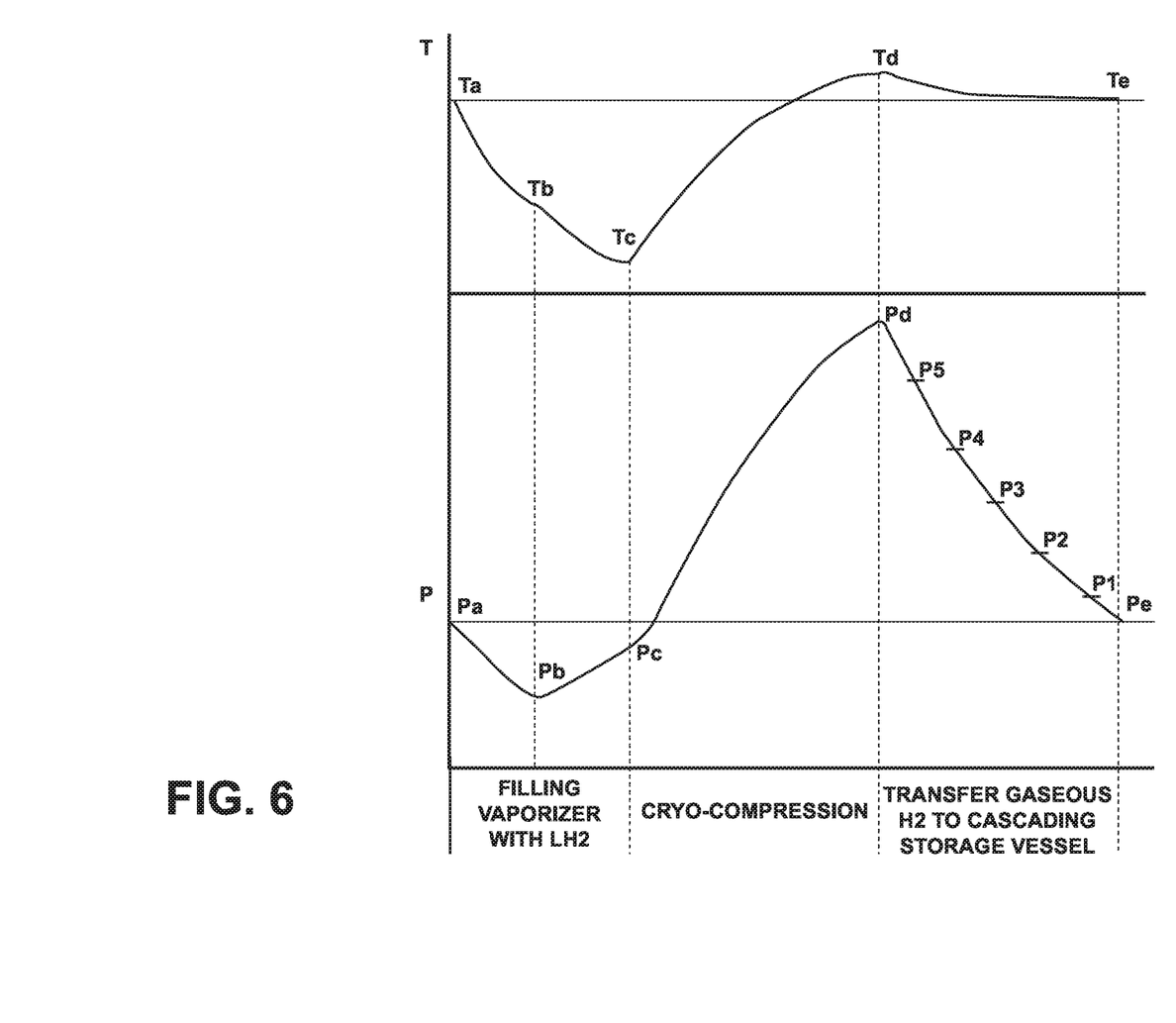
FIG. 6 is a pressure and temperature plot in accordance with a first example in which liquid hydrogen is converted to gaseous hydrogen.

With reference to FIG. 6, the hydrogen conversion and storage operation comprises categorically three stages. The first stage is to fill the vaporizer with liquid hydrogen supply. At the start of the first stage, the residual hydrogen within the vaporizer 16 begins at temperature Ta and pressure Pa. Ta may be ambient temperature or slightly below, for example at −40 C as required to fill hydrogen tanks in a hydrogen vehicle. In accordance with the present invention, Pa is approximately 150 bar, essentially the same as or slightly lower the pressure rating P1 of gas storage tank 24, i.e., 150 bar. The liquid pump 14 pumps liquid hydrogen from the cryogenic storage tank 12 to the vaporizer 16. As liquid hydrogen enters the vaporizer 16, the temperature of the hydrogen within the vaporizer 16 will decrease through Tb while the pressure decrease to Pb. As the liquid hydrogen continues to be pumped into vaporizer 16, the temperature of hydrogen in the vaporizer will continue to decrease but the pressure will start to increase as the amount of the hydrogen increases. Once filling is complete (i.e., the amount of liquid hydrogen required for autogenesis pressurization to Pd is pumped into vaporizer), the temperature and pressure within the vaporizer 16 are Tc and Pc, respectively. During the filling stage (or at the end of filling), the vaporizer may contain a mixture of liquid hydrogen and gaseous hydrogen. The ratio of liquid hydrogen and gaseous hydrogen depends on the "effective" thermal mass of the gaseous hydrogen and the vaporizer. The pumping pressure Pc required in accordance with the present invention for cryo-compression is a function of such ratio and the final pressure Pd at temperature Td. Depending on the specific design and operation conditions, Pc can be lower than Pa. In other cases, Pc may be higher, but will not exceed P1. Such upper limit in Pc is realized in the following manner. Once the internal pressure of the vaporizer 16 reaches the actual pressure in tank 24 (which should be less than P1) during filling of liquid hydrogen, the one-way valve 34 will open, to release the excessive gaseous hydrogen from the boiling off in vaporizer 16 to tank 24 whose actual pressure is lower than P1. Since tank 24 is sufficiently larger than vaporizer 16, the excessive gaseous hydrogen from the boiling off during filling of the vaporizer would result a slight increase in actual pressure in gas storage tank 24, typically less than P1 (150 bar), but will be certainly lower than the pressure rating of the liquid pump (160 bar). Thus, in accordance with the present invention, a significantly reduced pressure capacity requirement for the liquid pump (at 160 bar) will be sufficient to pump the required amount of liquid hydrogen into the vaporizer that will reach up to 1200 bar by means of autogenesis pressurization or cryo-compression. In other words, high pressure liquid pumps or any gas compressors are not necessary in accordance of present invention.

After the pressure in the vaporizer 16 reaches Pc and the required amount of liquid hydrogen entering the vaporizer 16, the operation of the system enters the second stage where autogenesis pressurization is utilized to increase the pressure of hydrogen gas in the vaporizer 16. The valve 15 between the liquid pump 14 and the vaporizer 16 will close, sealing the vaporizer 16 from the liquid pump 14. The temperature within the vaporizer then increases to Td, which can be the ambient temperature, for example. This can be accomplished by a parasitic heat leak into the vaporizer 16 from the environment. Additional heat can be added through another heat exchanger to increase the vaporization rate to meet high demands. As the temperature within the vaporizer 16 increases to Td, the liquid hydrogen will vaporizer and the internal pressure will rise, gradually reaching Pd by the process commonly known as cryo-compression or autogenesis pressurization. Pd can be in excess of 1200 bar, while in other designs Pd can be controlled to reach 900 bar, 400 bar, or other levels by regulating the liquid pumping pressure Pc and the amount of liquid hydrogen entered into vaporizer 16. For illustration purpose, at the end of second stage, Pd reaches 1000 bar to fill the 700 bar hydrogen gas tank 100 in a vehicle.

In the third stage, gaseous hydrogen is then allowed to flow from the vaporizer 16 to the gas storage tanks of the gaseous hydrogen storage system 18, in a specific fill sequence described herein below. First, the fifth gas storage tank 32 having the highest rated pressure capacity will be filled first, if its actual pressure is below its rated pressure capacity of P5 (900 bar). Valve 42 between vaporizer 16 and the first gas storage tank 32 opens, so gaseous hydrogen will flow from vaporizer to the tank 32 under a positive pressure differential until the pressure within the vaporizer 16 equalizes that of tank 32, or reaches its rated pressure capacity P5 (900 bar). Subsequently, the control valve 42 between vaporizer 16 and the fifth gas storage tank 32 will close and the control valve 40 between the fourth gas storage tank 30 having the second highest rated pressure (P4, 700 bar) will open. To improve filling rate, it may be desirable to close 42 and open 40 when the pressure difference between the vaporizer 16 and fifth gas storage tank reduces to a specified value, for example, 10 bar. The remaining gaseous hydrogen in vaporizer 16 will then flow into the fourth gas storage tank 30 under a positive pressure differential until the pressure within the vaporizer 16 equalizes that of the fourth gas storage tank 30, or reaches its rated pressure capacity P4 (700 bar). The filling process will cascade to the third gas storage tank 28 having the next highest pressure rating (P3, 500 bar), and so on to the second gas storage tank 26, and finally to the first gas storage tank 24.

It is understood that the vaporizer 16 will repeatedly receive liquid hydrogen and convert to high pressure gaseous hydrogen in order to fill all the gas storage tanks to their full capacity. It is also understood that when a particular gas storage tank is already at or close to its full pressure capacity, it will be skipped during the filling process. It is possible that at the end of filling of all the storage tanks, the pressure in the vaporizer is higher than P5. In such case, the vaporizer will act as a temporary storage vessel to hold the high pressure hydrogen gas until one of the gas storage tanks is ready to receive hydrogen from the vaporizer. The use of relatively large gas storage tanks and small vaporizers, combined with a slightly higher pressure rating of liquid pump over that of the lowest pressure tank 24 (P1), for example 10 bar, would eliminate or minimize the waste of hydrogen due to boiling off and vent lose.

Example 2

Figure 4:
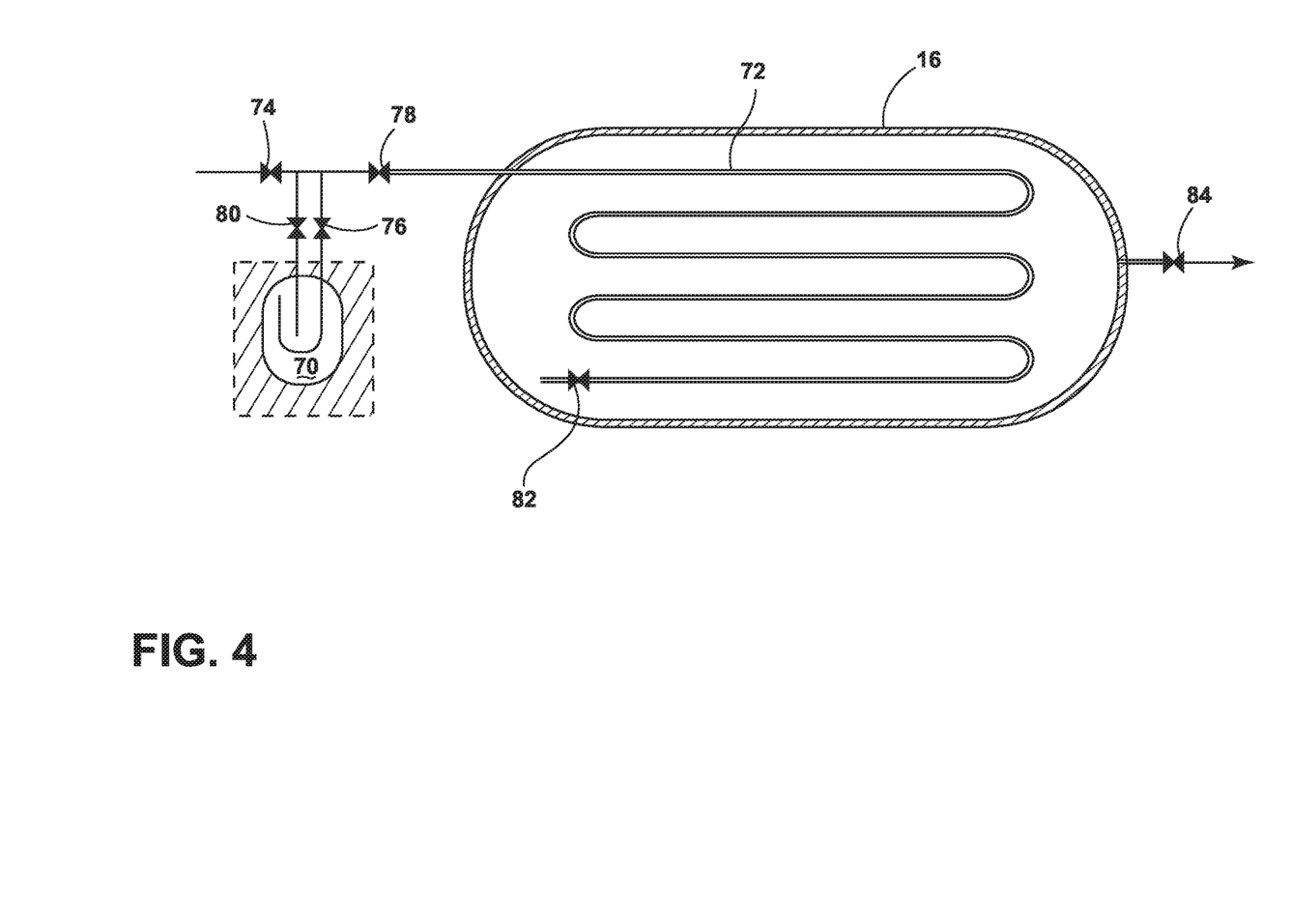
FIG. 4 is a schematic diagram of a vaporizer pre-cooling system using cryogenic hydrogen for cooling a vaporizer.
Figure 7:
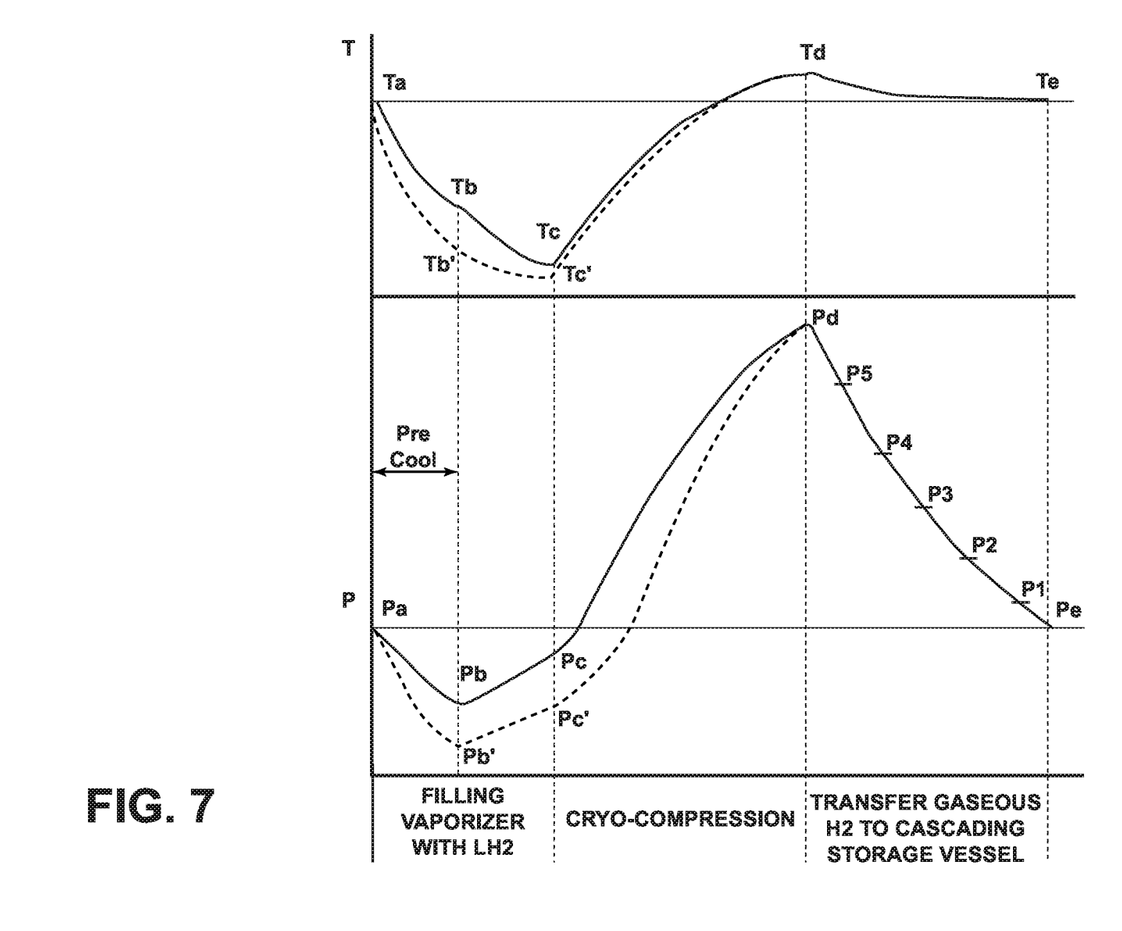
FIG. 7 is a pressure and temperature plot in accordance with a second example in which the vaporizer is pre-cooled.

The following example of a hydrogen conversion operation with pre-cooling is provided in connection with FIGS. 4 and 7, and is intended to be non-limiting. When pre-cooling is employed, the pressure inside the vaporizer 16 is significantly reduced.

As shown in FIG. 4, a pre-cooling system in accordance with one embodiment includes a well-insulated small hydrogen reservoir 70 connected between the liquid pump 14 and the vaporizer 16. The hydrogen in the reservoir 70 is fed through a small diameter exchange tubing 72 into the interior of the vaporizer 16. Various control valves 74, 76, 78, 80, 82, 84 control and regulate the flow of hydrogen.

The purpose of the pre-cooling is to reduce the pressure inside the vaporizer 16 to allow the liquid pump 14 to pump liquid hydrogen into the vaporizer 16 at a much lower pressure Pb' (FIG. 7). Pre-cooling begins after the completion of a filling cycle to the gaseous hydrogen storage system. At the completion of a filling cycle, valves 78 and 80 are closed and valve 82 is open so the internal exchange tubing 72 is in equilibrium with the hydrogen inside the vaporizer 16. Further, valve 84 is open and the pressure in the vaporizer is in equilibrium with the lowest pressure gas storage tank 24 in the storage system 18. We note also that the residual gaseous hydrogen inside the vaporizer is at Te and Pe.

Pre-cooling begins by closing the value 74 and 84, and opening the valves in-between, the hydrogen inside the vaporizer will be pushed back to the reservoir through 72 and circulated inside the reservoir because of its higher pressure. The much lower temperature hydrogen or liquid hydrogen inside the reservoir 70 is the cooling source for the pre-cooling procedure. This process ensures the liquid pump to operate with a lower pressure capacity requirement, with maximum pressure to be Pc' in FIG. 7. It is noted that the control valve 80 and 82 can be inside the tanks or outside the tanks. Alternatively, the vaporizer can have an internal or external auxiliary cooling/heating system. The cooling function is used for the pre-cooling process to allow it effectively being cooled down to Pc' in FIG. 7, and the heating function is used for the autogenous pressurization/cryo-compression.

After the pre-cooling process, the vaporizer 16 is at a pressure much lower than its initial residual pressure. The valve 74 is then open so that liquid hydrogen can be pumped through reservoir 70 and into the vaporizer 16. The supply liquid hydrogen will push the hydrogen inside the reservoir 70 into the vaporizer so that the internal temperature of the reservoir returns to a much lower temperature and pressure. This enhances the cooling of hydrogen inside the reservoir 70, which in turn will enhance the cooling of hydrogen inside the vaporizer 16. As the liquid hydrogen enters the exchange tubing 72 and the vaporizer 16 to further cool the hydrogen in the vaporizer 16. The liquid pump 14 continues to pump liquid hydrogen into the vaporizer 16 and the exchange tubing 72. Although the temperature inside the vaporizer 16 and the exchange tubing 72 will continue to decrease, the pressure is expected to increase at the end of cryogenic filling, at which point valves 74 and 78 will be closed, whereas valve 82 remains open. Because the reservoir 70 is well insulated, the hydrogen inside the reservoir 70 will maintain low temperatures during the subsequent stages until the next cryogenic filling of the vaporizer 16.

After filling of the vaporizer with the required amount of hydrogen and prior to autogenous pressurization, valves 78 and 80 are closed, and the internal exchange tubing 72 is in equilibrium with the hydrogen inside the vaporizer 16 with valve 82 open during the autogenous pressurization process. After the hydrogen inside the vaporizer reaches Pd, Td through the autogenous pressurization process (note that the heating element for the autogenous pressurization process is not shown in FIG. 4), valve 84 is then opened to transfer high pressure gaseous hydrogen to the gaseous hydrogen storage system 18.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for storing and dispensing hydrogen fuel, the method comprising:
   providing a supply of liquid hydrogen between 1 bar and 5 bar;
   pressuring the liquid hydrogen in at least one vaporizer using a liquid pump and filling the at least one vaporizer to between 20% and 100%, inclusive, of its full volumetric capacity;
   vaporizing the liquid hydrogen to gaseous hydrogen by raising the temperature of the liquid hydrogen to ambient temperature within the at least one vaporizer, the gaseous hydrogen having a pressure of between 200 bar and 1200 bar, inclusive;
   transferring the gaseous hydrogen to and storing the gaseous hydrogen in a storage system at ambient temperature without use of a compressor, the storage system including a plurality of gas storage tanks forming a cascade system with each of the plurality of gas storage tanks having a different pressure capacity rating and adapted to be independently filled with gaseous hydrogen from the at least one vaporizer,
   wherein the gas storage tank from among the plurality of gas storage tanks having the lowest pressure capacity rating receives boil-off gases from the at least one vaporizer during filling of the at least one vaporizer with liquid hydrogen, and
   wherein the liquid pump pressurizes the liquid hydrogen in the at least one vaporizer to no more than 20% of the pressure capacity rating of the gas storage tank from among of the plurality of gas storage tanks having the highest pressure capacity rating; and
   dispensing the gaseous hydrogen to a vehicle fuel tank serially from the gas storage tank of the plurality of gas storage tanks having the lowest usable pressure first followed by the gas storage tank of the plurality of gas storage tanks having the next lowest useable pressure.

2. The method of claim 1 further including pre-cooling the at least one vaporizer with liquid hydrogen to a temperature below ambient temperature.

3. The method of claim 1 wherein the at least one vaporizer includes a multi-layered sidewall having an inner layer and an outer layer, wherein the inner layer includes a greater coefficient of thermal expansion than a coefficient of thermal expansion of the outer layer.

4. The method of claim 3 further including filling the at least one vaporizer with liquid hydrogen such that an air gap develops between the inner layer and the outer layer.

5. The method of claim 1 wherein raising the temperature of the liquid hydrogen to ambient temperature is performed with a heat exchange from ambient air.

6. The method of claim 1 wherein the at least one vaporizer is a plurality of vaporizers coupled in parallel between a cryogenic tank and the storage system.

7. A method for storing and dispensing hydrogen fuel, the method comprising:
  providing a supply of liquid hydrogen between 1 bar and 5 bar;
  pre-cooling a vaporizer to a temperature below ambient temperature;
  pressuring the supply of liquid hydrogen and filling the vaporizer to between 20% and 100%, inclusive, of its full volumetric capacity;
  vaporizing the supply of liquid hydrogen to gaseous hydrogen by raising the temperature of the supply liquid hydrogen within the vaporizer, the gaseous hydrogen having a pressure of between 200 bar and 1200 bar;
  transferring the gaseous hydrogen to and storing the gaseous hydrogen in a storage system at ambient temperature without use of a compressor, the storage system including a plurality of gas storage tanks having a different pressure capacity rating and that are adapted to be independently filled with gaseous hydrogen from the vaporizer;
  wherein the step of pressurizing the supply of liquid hydrogen and filling the vaporizer includes pressurizing the supply of liquid hydrogen up to 50 bar above the lowest pressure capacity rating of the plurality of gas storage tanks;
  wherein the gas storage tank from among the plurality of gas storage tanks having the lowest pressure capacity rating receives boil-off gases from the vaporizer during filling of the vaporizer with liquid hydrogen; and
  dispensing the gaseous hydrogen to a vehicle fuel tank serially from the gas storage tank of the plurality of gas storage tanks having the lowest usable pressure first followed by the gas storage tank of the plurality of gas storage tanks having the next lowest useable pressure;
  wherein filling the vaporizer includes pressuring the supply of liquid hydrogen in the vaporizer to no more than 20% of the pressure capacity rating of the gas storage tank from among the plurality of gas storage tanks having the highest pressure capacity rating.

8. The method of claim 7 wherein the vaporizer includes a multi-layered sidewall having an inner layer and an outer layer, wherein the inner layer includes a greater coefficient of thermal expansion than a coefficient of thermal expansion of the outer layer.

9. The method of claim 8 further including filling the vaporizer with liquid hydrogen such that a vacuum develops between the inner layer and the outer layer.

10. The method of claim 7 wherein raising the temperature of the liquid hydrogen to ambient temperature is performed with a heat exchange from ambient air or ambient water.

11. The method of claim 7 wherein raising the temperature of the liquid hydrogen to ambient temperature is performed with a fluid having a lower freezing point than water.

12. The method of claim 7 wherein the vaporizer is one of a plurality of vaporizers coupled in parallel with each other and are disposed between a cryogenic storage tank and the storage system.

13. The method of claim 12 wherein the storage system includes a steel concrete composite vessel including a pre-stressed concrete outer shell.

14. The method of claim 7 wherein a liquid pump is adapted to pressurize the supply of liquid hydrogen in the vaporizer to fill the vaporizer to between 20% and 100%, inclusive, of its full volumetric capacity.

* * * * *